United States Patent
Klein

(10) Patent No.: US 7,461,320 B2
(45) Date of Patent: *Dec. 2, 2008

(54) MEMORY SYSTEM AND METHOD HAVING SELECTIVE ECC DURING LOW POWER REFRESH

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/433,217

(22) Filed: May 11, 2006

(65) Prior Publication Data

US 2006/0206769 A1 Sep. 14, 2006

Related U.S. Application Data

(63) Continuation of application No. 10/876,796, filed on Jun. 24, 2004.

(51) Int. Cl.
*G11C 29/00* (2006.01)
*H03M 13/00* (2006.01)

(52) U.S. Cl. .................. 714/754; 714/773; 714/765

(58) Field of Classification Search ............... 714/754, 714/773, 765

See application file for complete search history.

(56) References Cited

U.S. PATENT DOCUMENTS

| | | | |
|---|---|---|---|
| 4,334,295 A | 6/1982 | Nagami | 365/222 |
| 4,433,211 A | 2/1984 | McCalmont et al. | 179/1.5 S |
| 4,598,402 A | 7/1986 | Matsumoto et al. | 371/38 |
| 4,706,249 A | 11/1987 | Nakagawa et al. | 371/38 |
| 4,710,934 A | 12/1987 | Traynor | 371/38 |
| 4,766,573 A | 8/1988 | Takemae | 365/222 |
| 4,780,875 A | 10/1988 | Sakai | 371/38 |
| 4,858,236 A | 8/1989 | Ogasawara | 371/38 |
| 4,862,463 A | 8/1989 | Chen | 371/38 |
| 4,918,692 A | 4/1990 | Hidaka et al. | 371/2.2 |
| 4,937,830 A | 6/1990 | Kawashima et al. | 371/40.1 |
| 4,958,325 A | 9/1990 | Nakagome et al. | 365/206 |
| 5,056,089 A | 10/1991 | Furuta et al. | 371/3 |
| 5,127,014 A * | 6/1992 | Raynham | 714/754 |
| 5,172,339 A | 12/1992 | Noguchi et al. | 365/201 |
| 5,278,796 A | 1/1994 | Tillinghast et al. | 365/211 |

(Continued)

OTHER PUBLICATIONS

Stojko, J. et al., "*Error-Correction Code*", IBM Technical Disclosure Bulletin, vol. 10, No. 10, Mar. 1968.

*Primary Examiner*—Joseph D Torres
(74) *Attorney, Agent, or Firm*—Dorsey & Whitney LLP

(57) ABSTRACT

A computer system includes a processor coupled to a DRAM through a memory controller. The processor switches the DRAM to a low power refresh mode in which DRAM cells are refreshed at a sufficiently low rate that data retention errors may occur. Prior to switching the DRAM to the low power refresh mode, the processor identifies a region of an array of DRAM cells that contains essential data that needs to be protected from such data retention errors. The processor then reads data from the identified region, and either the DRAM or the memory controller generates error checking and correcting syndromes from the read data. The syndromes are stored in the DRAM, and the low power refresh mode is then entered. Upon exiting the low power refresh mode, the processor again reads the data from the identified region, and the read data is checked and corrected using the syndromes.

17 Claims, 6 Drawing Sheets

U.S. PATENT DOCUMENTS

| | | | |
|---|---|---|---|
| 5,291,498 A | 3/1994 | Jackson et al. | 371/40.1 |
| 5,307,356 A | 4/1994 | Fifield | 371/40.1 |
| 5,313,425 A | 5/1994 | Lee et al. | 365/201 |
| 5,313,464 A | 5/1994 | Reiff | 371/2.1 |
| 5,313,475 A | 5/1994 | Cromer et al. | 371/40.1 |
| 5,313,624 A * | 5/1994 | Harriman et al. | 714/6 |
| 5,321,661 A | 6/1994 | Iwakiri et al. | 365/222 |
| 5,335,201 A | 8/1994 | Walther et al. | 365/222 |
| 5,369,651 A | 11/1994 | Marisetty | 371/40.1 |
| 5,418,796 A | 5/1995 | Price et al. | 371/39.1 |
| 5,428,630 A | 6/1995 | Weng et al. | 371/40.1 |
| 5,432,802 A | 7/1995 | Tsuboi | 371/40.1 |
| 5,446,695 A | 8/1995 | Douse et al. | 365/222 |
| 5,448,578 A | 9/1995 | Kim | 371/40.4 |
| 5,450,424 A | 9/1995 | Okugaki et al. | 371/40.1 |
| 5,455,801 A | 10/1995 | Blodgett et al. | 365/222 |
| 5,459,742 A | 10/1995 | Cassidy et al. | 371/40.1 |
| 5,481,552 A | 1/1996 | Aldereguia et al. | 371/40.1 |
| 5,509,132 A | 4/1996 | Matsuda et al. | 395/403 |
| 5,513,135 A | 4/1996 | Dell et al. | 365/52 |
| 5,515,333 A | 5/1996 | Fujita et al. | 365/229 |
| 5,588,112 A | 12/1996 | Dearth et al. | 395/182.07 |
| 5,600,662 A * | 2/1997 | Zook | 714/769 |
| 5,604,703 A | 2/1997 | Nagashima | 365/200 |
| 5,623,506 A | 4/1997 | Dell et al. | 371/40.1 |
| 5,629,898 A * | 5/1997 | Idei et al. | 365/222 |
| 5,631,914 A | 5/1997 | Kashida et al. | 371/37.4 |
| 5,703,823 A | 12/1997 | Douse et al. | 365/222 |
| 5,706,225 A | 1/1998 | Buchenrieder et al. | 365/102 |
| 5,712,861 A | 1/1998 | Inoue et al. | 371/37.1 |
| 5,732,092 A | 3/1998 | Shinohara | 371/40.2 |
| 5,740,188 A | 4/1998 | Olarig | 371/40.11 |
| 5,754,753 A | 5/1998 | Smelser | 395/182.06 |
| 5,761,222 A | 6/1998 | Baldi | 371/40.18 |
| 5,765,185 A | 6/1998 | Lambrache et al. | 711/103 |
| 5,784,328 A | 7/1998 | Irrinki et al. | 365/222 |
| 5,784,391 A | 7/1998 | Konigsburg | 371/40.18 |
| 5,808,952 A | 9/1998 | Fung et al. | 365/222 |
| 5,841,418 A | 11/1998 | Bril et al. | 345/3 |
| 5,864,569 A | 1/1999 | Roohparvar | 371/40.18 |
| 5,878,059 A | 3/1999 | Maclellan | 371/40.13 |
| 5,896,404 A | 4/1999 | Kellogg et al. | 371/40.11 |
| 5,912,906 A | 6/1999 | Wu et al. | 371/40.11 |
| 5,953,278 A | 9/1999 | McAdams et al. | 365/219 |
| 5,961,660 A | 10/1999 | Capps, Jr. et al. | 714/763 |
| 5,963,103 A | 10/1999 | Blodgett | 331/75 |
| 6,009,547 A | 12/1999 | Jaquette et al. | 714/758 |
| 6,009,548 A | 12/1999 | Chen et al. | 714/762 |
| 6,018,817 A | 1/2000 | Chen et al. | 714/762 |
| 6,041,001 A | 3/2000 | Estakhri | 365/200 |
| 6,041,430 A | 3/2000 | Yamauchi | 714/752 |
| 6,085,283 A | 7/2000 | Toda | 711/104 |
| 6,085,334 A | 7/2000 | Giles et al. | 714/7 |
| 6,092,231 A | 7/2000 | Sze | 714/758 |
| 6,101,614 A | 8/2000 | Gonzales et al. | 714/6 |
| 6,125,467 A | 9/2000 | Dixon | 714/763 |
| 6,134,167 A | 10/2000 | Atkinson | 365/222 |
| 6,178,537 B1 | 1/2001 | Roohparvar | 714/773 |
| 6,199,139 B1 * | 3/2001 | Katayama et al. | 711/106 |
| 6,212,118 B1 | 4/2001 | Fujita | 365/222 |
| 6,212,631 B1 | 4/2001 | Springer et al. | 713/1 |
| 6,216,246 B1 | 4/2001 | Shau | 714/763 |
| 6,216,247 B1 | 4/2001 | Creta et al. | 714/763 |
| 6,219,807 B1 | 4/2001 | Ebihara et al. | 714/720 |
| 6,223,309 B1 | 4/2001 | Dixon et al. | 714/703 |
| 6,233,717 B1 | 5/2001 | Choi | 714/805 |
| 6,262,925 B1 | 7/2001 | Yamasaki | 365/200 |
| 6,279,072 B1 | 8/2001 | Williams et al. | 711/105 |
| 6,310,825 B1 | 10/2001 | Furuyama | 365/233 |
| 6,324,119 B1 | 11/2001 | Kim | 365/233 |
| 6,349,068 B2 | 2/2002 | Takemae et al. | 365/222 |
| 6,349,390 B1 | 2/2002 | Dell et al. | 714/6 |
| 6,353,910 B1 | 3/2002 | Carnevale et al. | 714/763 |
| 6,397,290 B1 | 5/2002 | Williams et al. | 711/105 |
| 6,397,357 B1 | 5/2002 | Cooper | 714/703 |
| 6,397,365 B1 | 5/2002 | Brewer et al. | 714/766 |
| 6,438,066 B1 | 8/2002 | Ooishi et al. | 365/233 |
| 6,442,644 B1 | 8/2002 | Gustavson et al. | 711/105 |
| 6,457,153 B2 | 9/2002 | Yamamoto et al. | 714/763 |
| 6,484,246 B2 | 11/2002 | Tsuchida et al. | 711/169 |
| 6,510,537 B1 | 1/2003 | Lee | 714/763 |
| 6,526,537 B2 | 2/2003 | Kishino | 714/763 |
| 6,549,460 B2 | 4/2003 | Nozoe et al. | 365/185.09 |
| 6,556,497 B2 | 4/2003 | Cowles et al. | 365/222 |
| 6,557,072 B2 | 4/2003 | Osborn | 711/106 |
| 6,560,155 B1 | 5/2003 | Hush | 365/222 |
| 6,584,543 B2 | 6/2003 | Williams et al. | 711/105 |
| 6,591,394 B2 | 7/2003 | Lee et al. | 714/766 |
| 6,594,796 B1 | 7/2003 | Chiang | 714/800 |
| 6,601,211 B1 | 7/2003 | Norman | 714/773 |
| 6,603,694 B1 | 8/2003 | Frankowsky et al. | 365/222 |
| 6,609,236 B2 | 8/2003 | Watanabe et al. | 716/8 |
| 6,614,698 B2 | 9/2003 | Ryan et al. | 365/189.04 |
| 6,618,281 B1 | 9/2003 | Gordon | 365/49 |
| 6,618,319 B2 | 9/2003 | Ooishi et al. | 365/233 |
| 6,628,558 B2 | 9/2003 | Fiscus | 365/222 |
| 6,636,444 B2 | 10/2003 | Uchida et al. | 365/189.05 |
| 6,636,446 B2 | 10/2003 | Lee et al. | 365/194 |
| 6,646,942 B2 | 11/2003 | Janzen | 365/222 |
| 6,662,333 B1 | 12/2003 | Zhang et al. | 714/767 |
| 6,665,231 B2 | 12/2003 | Mizuno et al. | 365/233 |
| 6,678,860 B1 | 1/2004 | Lee | 714/763 |
| 6,697,926 B2 | 2/2004 | Johnson et al. | 711/167 |
| 6,697,992 B2 * | 2/2004 | Ito et al. | 714/763 |
| 6,701,480 B1 | 3/2004 | Karpuszka et al. | 714/764 |
| 6,704,230 B1 | 3/2004 | DeBrosse et al. | 365/201 |
| 6,715,104 B2 | 3/2004 | Imbert de Tremiolles et al. | 714/25 |
| 6,715,116 B2 | 3/2004 | Lester et al. | 714/718 |
| 6,735,726 B2 | 5/2004 | Muranaka et al. | 714/708 |
| 6,751,143 B2 | 6/2004 | Morgan et al. | 365/222 |
| 6,754,858 B2 | 6/2004 | Borkenhagen et al. | 714/720 |
| 6,775,190 B2 | 8/2004 | Setogawa | 365/193 |
| 6,778,457 B1 | 8/2004 | Burgan | 365/222 |
| 6,781,908 B1 | 8/2004 | Pelley et al. | 365/222 |
| 6,788,616 B2 | 9/2004 | Takahashi | 365/233 |
| 6,789,209 B1 | 9/2004 | Suzuki et al. | 713/401 |
| 6,792,567 B2 | 9/2004 | Laurent | 714/763 |
| 6,795,362 B2 | 9/2004 | Nakai et al. | 365/222 |
| 6,807,108 B2 | 10/2004 | Maruyama et al. | 365/189.05 |
| 6,810,449 B1 | 10/2004 | Barth et al. | 710/61 |
| 6,819,624 B2 | 11/2004 | Acharya et al. | 365/233 |
| 6,834,022 B2 | 12/2004 | Derner et al. | 365/222 |
| 6,934,199 B2 | 8/2005 | Johnson et al. | 365/194 |
| 6,940,773 B2 | 9/2005 | Poechmueller | 365/222 |
| 6,965,537 B1 | 11/2005 | Klein et al. | 365/222 |
| 7,027,337 B2 | 4/2006 | Johnson et al. | 365/194 |
| 7,096,407 B2 | 8/2006 | Olarig | 714/768 |
| 7,099,221 B2 | 8/2006 | Klein | 365/222 |
| 7,116,602 B2 | 10/2006 | Klein | 365/222 |
| 7,117,420 B1 | 10/2006 | Yeung et al. | 714/763 |
| 7,171,605 B2 * | 1/2007 | White | 714/763 |
| 2001/0023496 A1 | 9/2001 | Yamamoto et al. | 714/763 |
| 2001/0029592 A1 | 10/2001 | Walker et al. | 714/42 |
| 2001/0044917 A1 | 11/2001 | Lester et al. | 714/718 |
| 2001/0052090 A1 | 12/2001 | Mio | 714/42 |
| 2001/0052102 A1 | 12/2001 | Roohparvar | 714/773 |
| 2002/0013924 A1 | 1/2002 | Yamasoto | 714/763 |
| 2002/0029316 A1 | 3/2002 | Williams et al. | 711/105 |
| 2002/0144210 A1 | 10/2002 | Borkenhagen et al. | 714/805 |
| 2002/0152444 A1 | 10/2002 | Chen et al. | 714/785 |
| 2002/0162069 A1 | 10/2002 | Laurent | 714/763 |
| 2002/0184592 A1 | 12/2002 | Koga et al. | 714/763 |
| 2003/0009721 A1 | 1/2003 | Hsu et al. | 714/773 |

| | | | | | | |
|---|---|---|---|---|---|---|
| 2003/0070054 A1 | 4/2003 | Williams et al. ............ 711/173 | 2004/0098654 A1 | 5/2004 | Cheng et al. ................ 714/758 |
| 2003/0093744 A1 | 5/2003 | Leung et al. ................ 714/763 | 2004/0117723 A1 | 6/2004 | Foss ........................... 714/805 |
| 2003/0097608 A1 | 5/2003 | Rodeheffer et al. ............ 714/7 | 2004/0225944 A1 | 11/2004 | Brueggen ................... 714/758 |
| 2003/0101405 A1 | 5/2003 | Shibata ....................... 714/763 | 2005/0099868 A1 | 5/2005 | Oh .............................. 365/222 |
| 2003/0149855 A1 | 8/2003 | Shibata et al. .............. 711/200 | 2005/0122797 A1 | 6/2005 | Johnson et al. ............. 365/195 |
| 2003/0167437 A1 | 9/2003 | DeSota et al. ............... 714/763 | 2006/0152983 A1 | 7/2006 | Johnson et al. ............. 365/194 |
| 2003/0191888 A1 | 10/2003 | Klein ......................... 711/105 | 2008/0092016 A1 | 4/2008 | Pawlowski ................... 714/764 |
| 2004/0008562 A1 | 1/2004 | Ito et al. ..................... 365/223 | 2008/0109705 A1 | 5/2008 | Pawlowski et al. .......... 714/767 |
| 2004/0064646 A1 | 4/2004 | Emerson et al. ............. 711/131 | | | |
| 2004/0083334 A1 | 4/2004 | Chang et al. ................ 711/103 | * cited by examiner | | |

CONTROL REGISTER:

MEMORY SYSTEM AND METHOD HAVING SELECTIVE ECC DURING LOW POWER REFRESH

CROSS-REFERENCE TO RELATED APPLICATION

This application is a continuation of pending U.S. patent application Ser. No. 10/876,796, filed Jun. 24, 2004.

TECHNICAL FIELD

This invention relates to dynamic random access memory ("DRAM") devices and systems, and, more particularly, to a method and system for allowing DRAM cells to be refreshed at a relatively low rate to reduce power consumption.

BACKGROUND OF THE INVENTION

As the use of electronic devices, such as personal computers, continue to increase, it is becoming ever more important to make such devices portable. The usefulness of portable electronic devices, such as notebook computers, is limited by the limited length of time batteries are capable of powering the device before needing to be recharged. This problem has been addressed by attempts to increase battery life and attempts to reduce the rate at which such electronic devices consume power.

Various techniques have been used to reduce power consumption in electronic devices, the nature of which often depends upon the type of power consuming electronic circuits that are in the device. Electronic devices, such notebook computers, typically include dynamic random access memory ("DRAM") devices that consume a substantial amount of power. As the data storage capacity and operating speeds of DRAM devices continues to increase, the power consumed by such devices has continued to increase in a corresponding manner. In general, the power consumed by a DRAM device increases with both the capacity and the operating speed of the DRAM devices.

The power consumed by DRAM devices is also affected by their operating mode. A DRAM device, for example, will generally consume a relatively large amount of power when the DRAM cells are being refreshed. As is well-known in the art, DRAM cells, each of which essentially consists of a capacitor, must be periodically refreshed to retain data stored in the DRAM device. Refresh is typically performed by essentially reading data bits from the memory cells in each row of a memory cell array and then writing those same data bits back to the same cells in the row. A relatively large amount of power is consumed when refreshing a DRAM because rows of memory cells in a memory cell array are being actuated in the rapid sequence. Each time a row of memory cells is actuated, a pair of digit lines for each memory cell are switched to complementary voltages and then equilibrated. As a result, DRAM refreshes tends to be particularly power-hungry operations. Further, since refreshing memory cells must be accomplished even when the DRAM is not being used and is thus inactive, the amount of power consumed by refresh is a critical determinant of the amount of power consumed by the DRAM over an extended period. Thus many attempts to reduce power consumption in DRAM devices have focused on reducing the rate at which power is consumed during refresh.

Refresh power can, of course, be reduced by reducing the rate at which the memory cells in a DRAM are being refreshed. However, reducing the refresh rate increases the risk of data stored in the DRAM cells being lost. More specifically, since, as mentioned above, DRAM cells are essentially capacitors, charge inherently leaks from the memory cell capacitors, which can change the value of a data bit stored in the memory cell over time. However, current leaks from capacitors at varying rates. Some capacitors are essentially short-circuited and are thus incapable of storing charge indicative of a data bit. These defective memory cells can be detected during production testing, and can then be repaired by substituting non-defective memory cells using conventional redundancy circuitry. On the other hand, current leaks from most DRAM cells at much slower rates that span a wide range. A DRAM refresh rate is chosen to ensure that all but a few memory cells can store data bits without data loss. This refresh rate is typically once every 64 ms. The memory cells that cannot reliably retain data bits at this refresh rate are detected during production testing and replaced by redundant memory cells. However, the rate of current leakage from DRAM cells can change after production testing, both as a matter of time and from subsequent production steps, such as in packaging DRAM chips. Current leakage, and hence the rate of data loss, can also be effected by environmental factors, such as the temperature of DRAM devices. Therefore, despite production testing, a few memory cells will typically be unable to retain stored data bits at normal refresh rates.

One technique that has been used to correct data errors in DRAMs is to generate an error correcting code "ECC from each item of stored data, and then store the ECC, known as a syndrome, along with the data. The use of ECC techniques during refresh could allow the power consumed by a DRAM device to be reduced because the ability of ECC to correct data retention errors would allow the refresh rate to be slowed to such an extent that errors can occur. Significantly reducing the refresh rate of a DRAM device would result in a substantial reduction in the power consumed by the DRAM device.

Although the use of ECC techniques during refresh could substantially reduce power consumption during refresh, it could impose significant cost penalties in both the cost and the performance of DRAM devices. In particular, the development cost and manufacturing cost of a DRAM device or a memory controller would be increased by the cost to develop and manufacture the additional circuitry needed to perform the ECC function. The increase in manufacturing cost for additional features in DRAM devices is normally manifested in a larger semiconductor die size, which reduces the yield from each semiconductor wafer. It can also be anticipated that the performance of DRAM devices would be impaired by reduced operating speeds resulting from the need to check and possibly correct all data read from the DRAM devices as well as the need to create syndromes for all data written to the DRAM devices.

There is therefore a need for a system and method for reducing power consumption by refreshing DRAM cells at a reduced rate without incurring the cost and performance penalties needed to check and possibly correct all of the data read from the DRAM device and to create syndromes for all data written to the DRAM device.

SUMMARY OF THE INVENTION

A method and system for refreshing memory cells in a dynamic random access memory ("DRAM") device is coupled to a processor in a computer system. The memory cells in the DRAM are refreshed at a reduced power rate that is sufficiently slow that data retention errors can be expected to occur during refresh. However, the expected data retention errors are corrected using ECC techniques applied only to memory cells containing essential data that should be protected from data retention errors. More specifically, prior to refreshing the memory cells at the reduced power rate, a determination is made, preferably by the processor, which memory cells are storing the essential data. ECC techniques are then used to check and correct the essential data without using ECC techniques to check and correct data stored in other memory cells. Prior to refreshing the memory cells at the reduced power rate, the essential data are read, and corresponding syndromes are generated and stored. When departing from the low power refresh rate, the essential data are again read, and the stored syndromes are used to check the read data for errors. If any errors are found, the syndromes are used to correct the data, and the corrected data are written to the DRAM.

DETAILED DESCRIPTION

Figure 1:
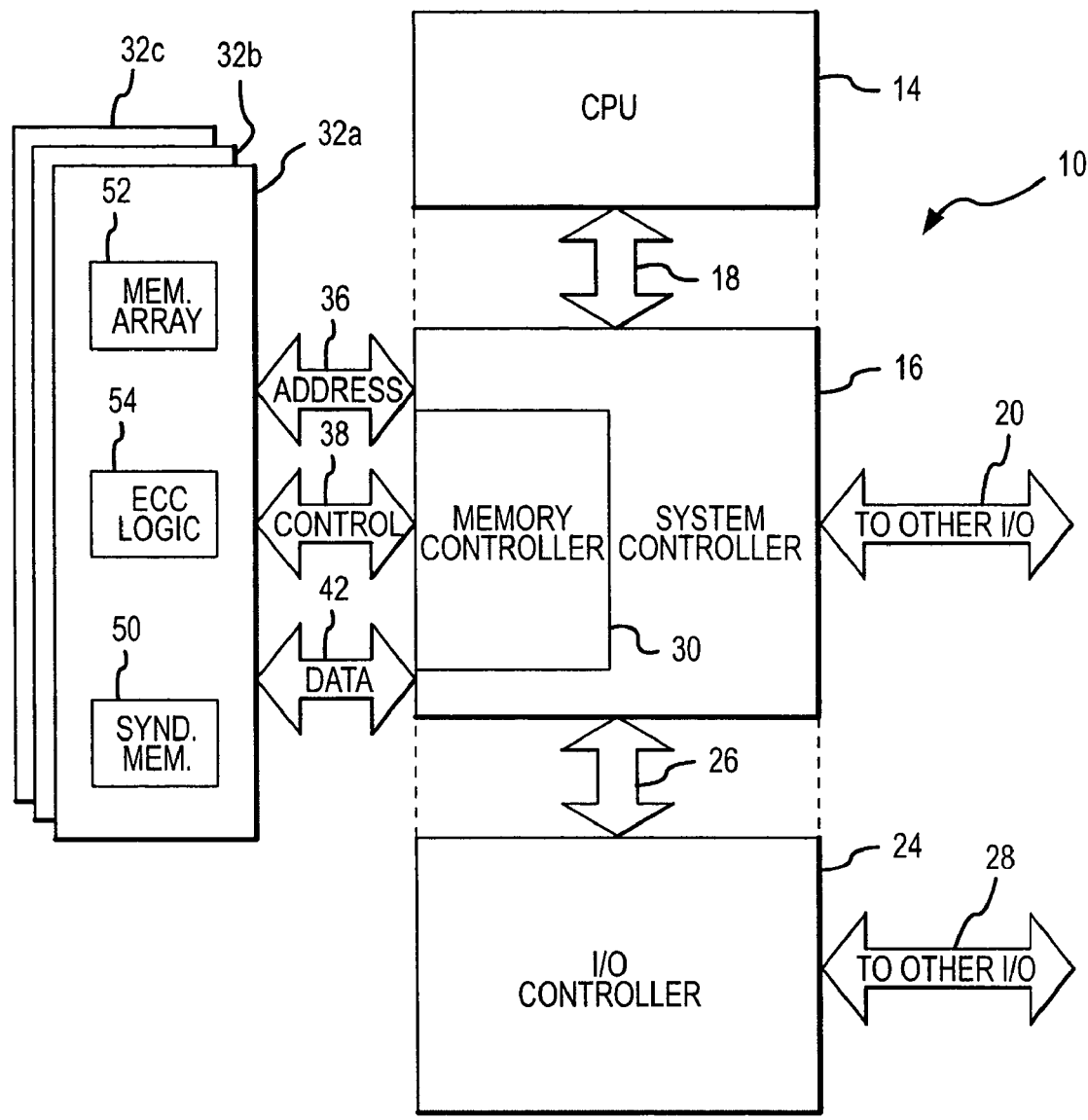
FIG. 1 is a block diagram of a computer system according to one embodiment of the invention.

A computer system 10 according to one embodiment of the invention is shown in FIG. 1. The computer system 10 includes a central processor unit ("CPU") 14 coupled to a system controller 16 through a processor bus 18. The system controller 16 is coupled to input/output ("I/O") devices (not shown) through a peripheral bus 20 and to an I/0 controller 24 through an expansion bus 26. The I/O controller 24 is also connected to various peripheral devices (not shown) through another I/0 bus 28.

The system controller 16 includes a memory controller 30 that is coupled to several dynamic random access memory ("DRAM") device 32a-c through an address bus 36, a control bus 38, and a data bus 42. The locations in each of the DRAMs 32a-c to which data are written and data are read are designated by addresses coupled to the DRAMs 32a-c on the address bus 36. The operation of the DRAMs 32a-c are controlled by control signals coupled to the DRAMs 32a-c on the control bus 38.

In other embodiments of the invention, the memory controller 30 may be coupled to one or more memory modules (not shown) through the address bus 36, the control bus 38, and the data bus 42. Each of the memory modules would normally contain several of the DRAMs 32.

With further reference to FIG. 1, the DRAMs 32a-c each include a syndrome memory 50, a memory array 52 and ECC logic 54. The ECC logic 54 generates a syndrome from write data received from the memory controller 30, and stores the syndrome in the syndrome memory 40 while the write data are being stored in the memory array 52 of the DRAM 32. When data are read from the DRAM 32, the read data are coupled from memory array 52 to the ECC logic 54 and the syndrome are coupled from the syndrome memory 40 to the ECC logic 54. The ECC logic 54 then uses the syndrome to determine if the read data contains an erroneous data bit, and, if more than one data bit is not in error, to correct the erroneous data bit. The corrected read data are then coupled to the memory controller 30 through the data bus 42. Although the syndrome memory 50 may be a separate memory array in the DRAM 32 as shown in FIG. 1, it may alternatively be included in the same array of DRAM cells that are used to store data, as explained in greater detail below. The use of ECC allows the refresh rate of the memory cells in the memory array 52 to be reduced to a rate at which some data retention errors can occur since such errors can be corrected using the syndromes stored in the syndrome memory 50 and the ECC logic 52.

The DRAM 32 is able to use ECC techniques with relatively little of the costs and performance impairments associated with conventional ECC techniques because the CPU 14 uses ECC techniques to check and correct only the data stored in the memory array 52 that needs to be correct. More specifically, conventional computer systems and other electronic systems use DRAM devices to store a variety of data types. For example, a DRAM device may be used as a "scratch pad" memory or to store audio data or video data that is being coupled to a display. This type of data is usually overwritten with new data quite frequently, and is therefore generally not used after an extended refresh. Other data, such as program instructions, spreadsheet data, word processing documents, must be protected during refresh. Therefore, the CPU 14 applies ECC techniques to this type of data.

The CPU 14 can determine which data to protect through a variety of means. For example, the CPU 14 can store essential data that needs to be protected in only certain regions of the memory array 52, and then apply ECC techniques to these regions. The CPU 14 can also keep track of where in the memory array 52 essential data are stored, and then apply ECC techniques to these regions. Other techniques may also be used.

In operation, prior to each of the DRAMs 32a-c entering a low power refresh mode, the DRAMs 32a-c perform a read and syndrome generating operation. More specifically, the CPU 14 enables the ECC logic 54 by suitable means, such as by coupling a command signal to the DRAMs 32a-c through the memory controller 30 and control bus 38 that enables a control register in the DRAM 32. However, the CPU may enable the ECC logic 54 by other means, such as by coupling control signals directly to the ECC logic 54, by coupling an unsupported command to the DRAM 32, use of a specific sequence of operations, or by other means. In any case, once the ECC logic 54 has been enabled, the CPU 14 performs a read operation to the regions of the memory array 52 that store essential data that needs to be protected. The read operation is preferably performed in a burst read mode to minimize the time required for the read operation. Regions of the memory array 52 that store non-essential data, such as regions used as image buffers, temporary buffers and screen buffers, are not read. During the read operation, the DRAM 32 generates syndromes from the read data, and stores the syndromes in the syndrome memory 50. The DRAM 32 then enters a low power refresh mode in which the memory cells in the array 52 are refreshed at a rate that is sufficiently low that data retention errors may occur. In one embodiment of the invention, the CPU 14 leaves the ECC logic 54 enabled during the low power refresh mode to correct any data retention errors as they occur. In another embodiment of the invention, the CPU 14 disables the ECC logic 54 after all of the syndromes have been stored and before entering the low power refresh mode. In this embodiment, the CPU 14 corrects any data retention errors that have occurred when exiting the low power refresh mode, as explained in greater detail below.

When exiting the low power refresh mode, the DRAMs 32a-c perform a read and correct operation. More specifically, the CPU 14 enables the ECC logic 54 if it was not enabled during the refresh mode. The CPU 14 then reads data from the protected regions of the memory array 52, again preferably using a burst read mode. During these read operations, the ECC logic 54 receives the read data from the memory array 52 and the corresponding syndromes from the syndrome memory 50. The ECC logic 54 then uses the syndromes to check the read data and to correct any errors that are found. The ECC logic 54 then writes the corrected data to the memory array 52. Once the protected regions of the memory array 52 have been read, and the refresh rate increased to the normal refresh rate, the CPU 14 can disable the ECC logic 54.

In other embodiments of the invention, the CPU 14 initiates a read operation prior to entering the low power refresh mode, but the actual reading of data from the protected areas is accomplished by sequencer logic in the DRAMs 32 or in a memory module containing the DRAMs 32. The operation of the sequencer logic could be initiated by commands from the CPU 14 other than a read command, such as by issuing commands for a "dummy" operation, i.e., an operation that is not actually implemented by the DRAMs 32.

In still another embodiment of the invention, the data stored in ECC protected areas regions of the memory array 52 are not checked and corrected when exiting the low power refresh mode. Instead, the ECC mode remains active during normal operation, and the data stored in the ECC protected regions are checked using the stored syndromes whenever that data are read during normal operation. This embodiment requires that the syndrome memory 50 remain powered during normal operation, at least until all of the data stored in the protected regions have been read. A complicating factor is the possibility of the data stored in the protected region being changed by a write to that region without the syndrome also being changed accordingly. Of course, if the write is for a data word equal in size to the data words used to create the syndromes, there would be no problem because the protected data would be entirely replaced after exiting the low power refresh mode. However, if a write occurs for part of a word used to create a stored syndrome, then the syndrome will no longer correspond to the modified word. As a result, when the word is subsequently read, the ECC logic 54 would report a data retention error even if the data are not in error. There are several ways of handling this problem. For example, the operating system being executed by the CPU 14 could determine which stored data words will be the subject of a partial write. The CPU 14 could then check these words for errors when exiting the low power refresh mode, and correct any errors that are found. Another technique would be to check and correct each stored data word just before a partial write to the data word occurs. Other techniques may also be used.

Figure 2:
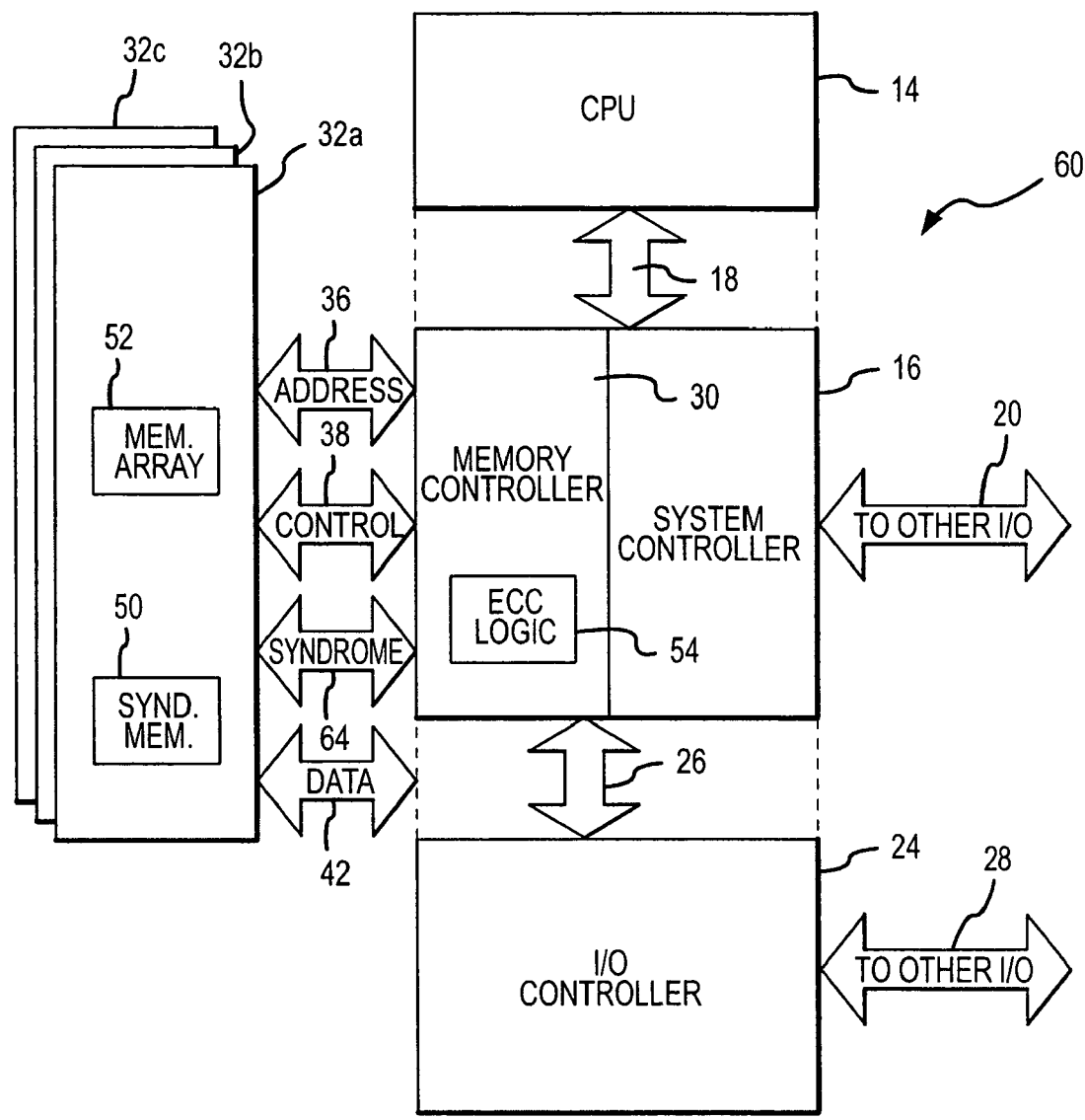
FIG. 2 is a block diagram of a computer system according to another embodiment of the invention.

A computer system 60 according to another embodiment of the invention is shown in FIG. 2. The computer system 60 is very similar in structure and operation to the computer system 10 of FIG. 1. Therefore, in the interests of brevity, corresponding components have been provided with the same reference numerals, and a description of their operation will not be repeated. The computer system 60 of FIG. 2 differs from the computer system 10 of FIG. 1 primarily in the addition of a syndrome bus 64 and the elimination of the ECC logic 54 from the DRAMs 32. In the computer system 60, the ECC logic 54 is located in the memory controller 30. Therefore, prior to entering the low power refresh mode, read data from the protected regions of the memory array 52 are coupled to the ECC logic 54 in the memory controller 30 through the data bus 42. The ECC logic 54 then generates syndromes, which are coupled to the syndrome memory 50 in the DRAMs 32 through the syndrome bus 64. When exiting the low power refresh mode, the read data in the protected regions are coupled to the ECC logic 54 through the data bus 42, and the corresponding syndromes are coupled from the syndrome memory 50 to the ECC logic 54 through the syndrome bus 64. The ECC logic 54 then checks the read data, corrects any errors that are found, and couples corrected data through the data bus 42, which are written to the memory array 52. The advantage of the computer system 10 of FIG. 1 over the memory device 60 is that the DRAMs 32 used in the system 10 of FIG. 1 are plug compatible with conventional DRAMs, thus making it unnecessary to physically alter the computer system to accommodate selective ECC during low power refresh.

Figure 3:
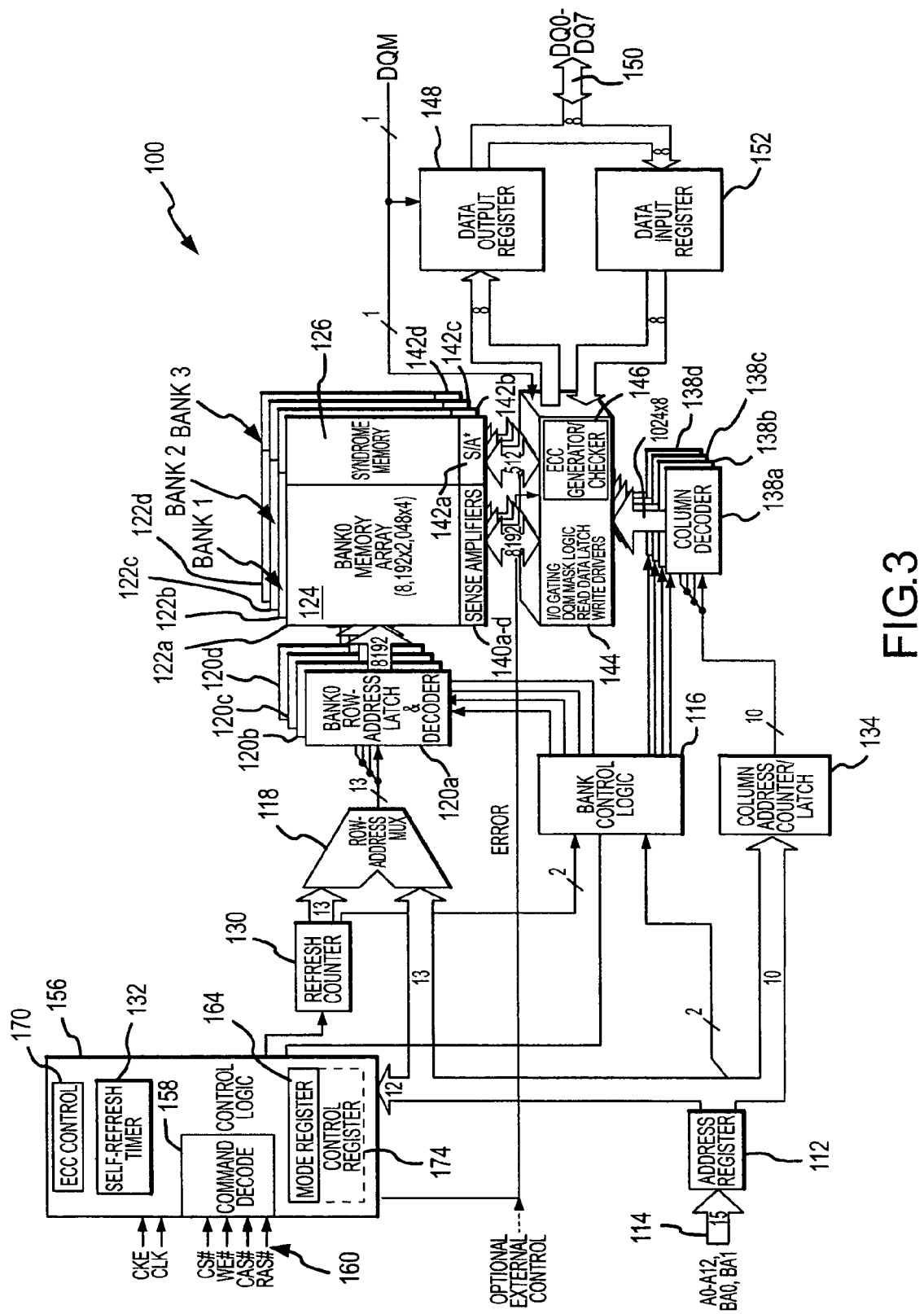
FIG. 3 is a block diagram of a DRAM device according to one embodiment of the invention.

A synchronous DRAM 100 ("SDRAM") according to one embodiment of the invention is shown in FIG. 3. The SDRAM 100 includes an address register 112 that receives bank addresses, row addresses and column addresses on an address bus 114. The address bus 114 is coupled to the memory controller 30 (FIG. 1). Typically, a bank address is received by the address register 112 and is coupled to bank control logic 116 that generates bank control signals, which are described further below. The bank address is normally coupled to the SDRAM 100 along with a row address. The row address is received by the address register 112 and applied to a row address multiplexer 118. The row address multiplexer 118 couples the row address to row address latch & decoder circuit 120a-d for each of several banks of memory cell arrays 122a-d, respectively. Each bank 120a-d is divided into two sections, a data second 124 that is used for storing data, and a syndrome section 126 that is used for storing syndromes. Thus, unlike the DRAM 32 of FIGS. 1 and 2, a separate syndrome memory 50 is not used in the SDRAM 100 of FIG. 3.

Each of the latch & decoder circuits 120a-d is selectively enabled by a control signal from the bank control logic 116 depending on which bank of memory cell arrays 122a-d is selected by the bank address. The selected latch & decoder circuit 120 applies various signals to its respective bank 122 as a function of the row address stored in the latch & decoder circuit 120. These signals include word line voltages that activate respective rows of memory cells in the banks 122. The row address multiplexer 118 also couples row addresses to the row address latch & decoder circuits 120a-d for the purpose of refreshing the memory cells in the banks 122a-d. The row addresses are generated for refresh purposes by a refresh counter 130. During operation in a self-refresh mode, the refresh counter 130 periodically begins operating at times controlled by a self-refresh timer 132. The self-refresh timer 132 preferably initiates refreshes at a relatively slow rate in the low power refresh mode, as explained above.

After the bank and row addresses have been applied to the address register 112, a column address is applied to the address register 112. The address register 112 couples the column address to a column address counter/latch circuit 134. The counter/latch circuit 134 stores the column address, and, when operating in a burst mode, generates column addresses that increment from the received column address. In either case, either the stored column address or incrementally increasing column addresses are coupled to column address & decoders 138a-d for the respective banks 122a-d. The column address & decoders 138a-d apply various signals to respective sense amplifiers 140a-d and 142a-d through column interface circuitry 144. The column interface circuitry 144 includes conventional I/O gating circuits, DQM mask logic, read data latches for storing read data from the memory cells in the banks 122 and write drivers for coupling write data to the memory cells in the banks 122. The column interface circuitry 144 also includes an ECC generator/checker 146 that essentially performs the same function as the ECC logic 54 in the DRAMS 32 of FIGS. 1 and 2.

Syndromes read from the syndrome section 126 of one of the banks 122a-d are sensed by the respective set of sense amplifiers 142a-d and then coupled to the ECC generator checker 146. Data read from the data section 124 one of the banks 122a-d are sensed by the respective set of sense amplifiers 140a-d and then stored in the read data latches in the column interface circuitry 144. The data are then coupled to a data output register 148, which applies the read data to a data bus 150. Data to be written to the memory cells in one of the banks 122a-d are coupled from the data bus 150 through a data input register 152 to write drivers in the column interface circuitry 144. The write drivers then couple the data to the memory cells in one of the banks 122a-d. A data mask signal "DQM" is applied to the column interface circuitry 144 and the data output register 148 to selectively alter the flow of data into and out of the column interface circuitry 144, such as by selectively masking data to be read from the banks of memory cell arrays 122a-d.

The above-described operation of the SDRAM 100 is controlled by control logic 156, which includes a command decoder 158 that receives command signals through a command bus 160. These high level command signals, which are generated by the memory controller 30 (FIG. 1), are a clock a chip select signal CS#, a write enable signal WE#, a column address strobe signal CAS#, and a row address strobe signal RAS#, with the "#" designating the signal as active low. Various combinations of these signals are registered as respective commands, such as a read command or a write command. The control logic 156 also receives a clock signal CLK and a clock enable signal CKE#, which cause the SDRAM 100 to operate in a synchronous manner. The control logic 156 generates a sequence of control signals responsive to the command signals to carry out the function (e.g., a read or a write) designated by each of the command signals. The control logic 156 also applies signals to the refresh counter 130 to control the operation of the refresh counter 130 during refresh of the memory cells in the banks 122. The control logic 156 also applies signals to the refresh timer 132 to control the refresh rate and allow the SDRAM 100 to operate in the low power refresh mode. The control signals generated by the control logic 156, and the manner in which they accomplish their respective functions, are conventional. Therefore, in the interest of brevity, a further explanation of these control signals will be omitted.

The control logic 156 also includes a mode register 164 that may be programmed by signals coupled through the command bus 160 during initialization of the SDRAM 100. The mode register 164 then generates mode control signals that are used by the control logic 156 to control the operation of the SDRAM 100 in various modes, such as the low power refresh mode. The mode register 164 may also include an ECC controller 170 that causes the control logic 156 to issue control signals to the ECC generator checker 146 and other components to generate syndromes for storage in the syndrome section 126 of the banks 122a-d, and to check and correct data read from the data section 124 of the banks 122a-d using syndromes stored in the sections 126. The ECC controller 170 is preferably enabled and disabled by a mode signal from the mode register 164, as explained above.

Figure 4:
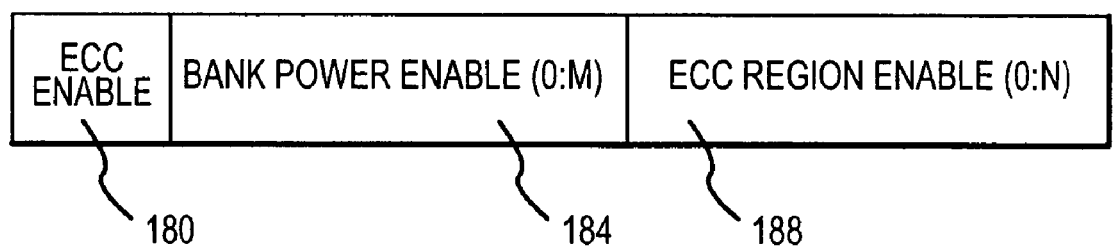
FIG. 4 is a schematic diagram illustrating the data structure of control data that may be stored in a control register in the DRAM of FIG. 3.

In an alternative embodiment, the control logic 156 may include a control register 174 that can receive control signals from the CPU 14 (FIG. 1) to directly control the operation of the ECC generator checker 146, as explained above. The contents of the control register 174 in one embodiment of the invention are shown in FIG. 4. A first bit 180 of the control register 174 is either set or reset to enable or disable, respectively, the ECC mode. The next M+1 bits 184 of the control register 180 selects which memory banks 122 are to be powered, thereby allowing the CPU 14 to selectively apply power to each of the memory banks 122. In the SDRAM 100 of FIG. 3, there are 4 bits bank power control bits 184 for the respective banks 122a-d. The final N+1 bits 188 select each region of each bank 122 that is to be ECC protected. The bits 188 could allow only a portion of a bank 122 to be refreshed, or all of a bank to be refreshed.

Figure 5:
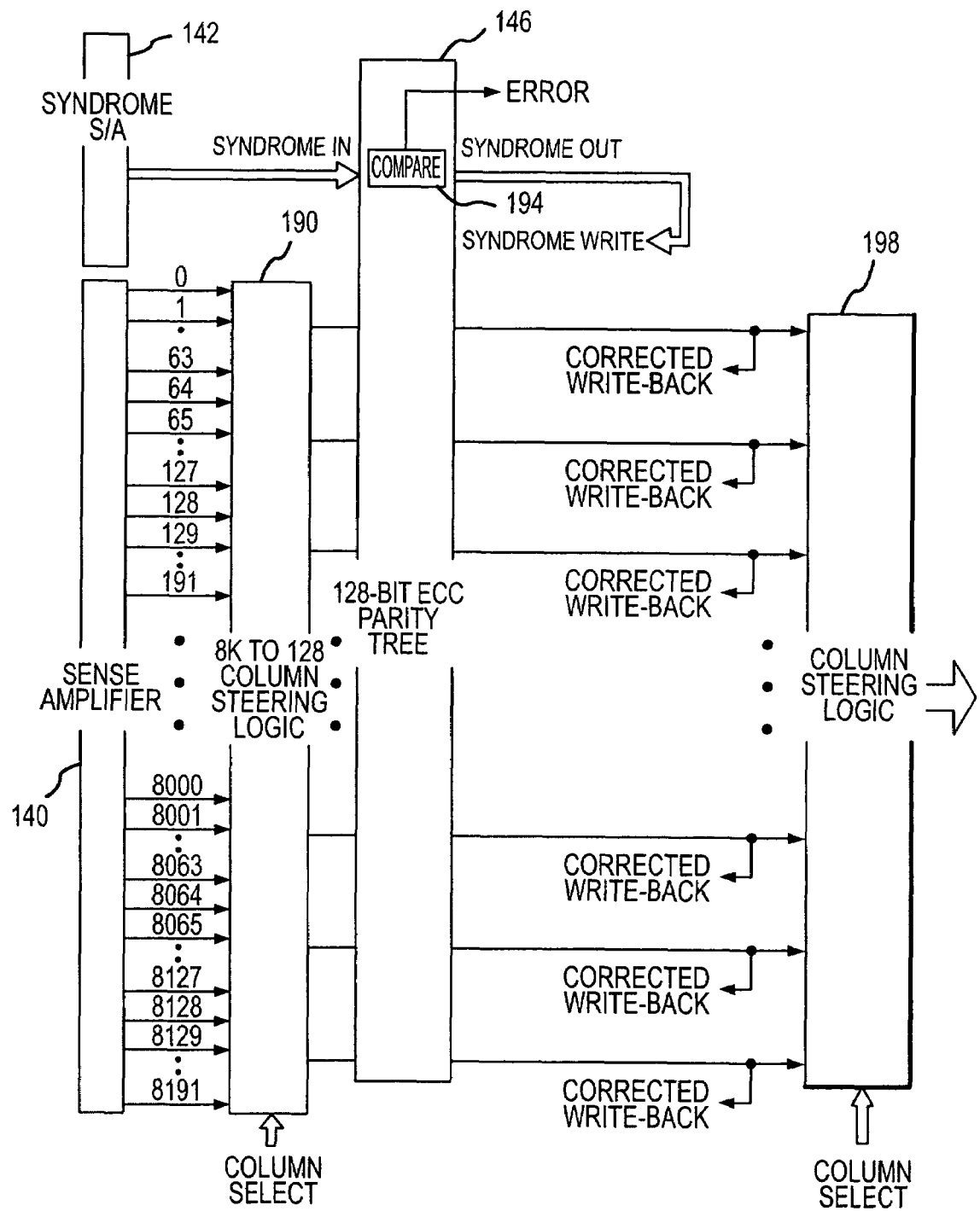
FIG. 5 is a block diagram of a portion of column interface circuitry used in the DRAM of FIG. 3.

The interfaces between the sense amplifiers 140, 142, the ECC generator/checker 146 and certain components in the column interface circuitry 144 are shown in greater detail in FIG. 5. The sense amplifiers 142 coupled to the data sections 124 of the memory banks 122a-d output respective data bits for respective columns, which are applied to column steering logic 190. In the embodiment shown in FIG. 5, the sense amplifiers 142 output respective data bits for 8,192 columns. The column steering logic 190 uses the 6 most significant bits 2-7 of a column address to select 1 of 64 128-bit groups of data bits and couples the data bits to the ECC generator/checker 146. The sense amplifiers 140 coupled to the syndrome section of the memory banks 122a-d couple a syndrome corresponding to the read data directly to the ECC generator/checker 146.

The ECC generator/checker 146 includes a comparator 194 that provides an error indication in the event the read data contains an error. The ECC generator/checker 146 then couples the corrected 128-bit word to additional column steering logic 198, and also couples the corrected 128-bit word back through the column steering logic 180 to the banks 122a-d so that the banks will now contain correct data. The column steering logic 198 uses the 2 least significant bits 0-1 of a column address to select 1 of 4 32-bit groups of data bits and couples the data bits to the memory controller 30 (FIG. 1), as previously explained. It is not necessary for the column steering logic 198 to couple the syndrome to the memory controller 30 in the computer system 10 of FIG. 1 so that the operation error checking and correction function is transparent to the memory controller 30. Also, although 128 bits of write data are used to form the syndrome, it is not necessary for the DRAM 32 to include externally accessible data terminals for each of these 128 bits.

Figures 6, 7:
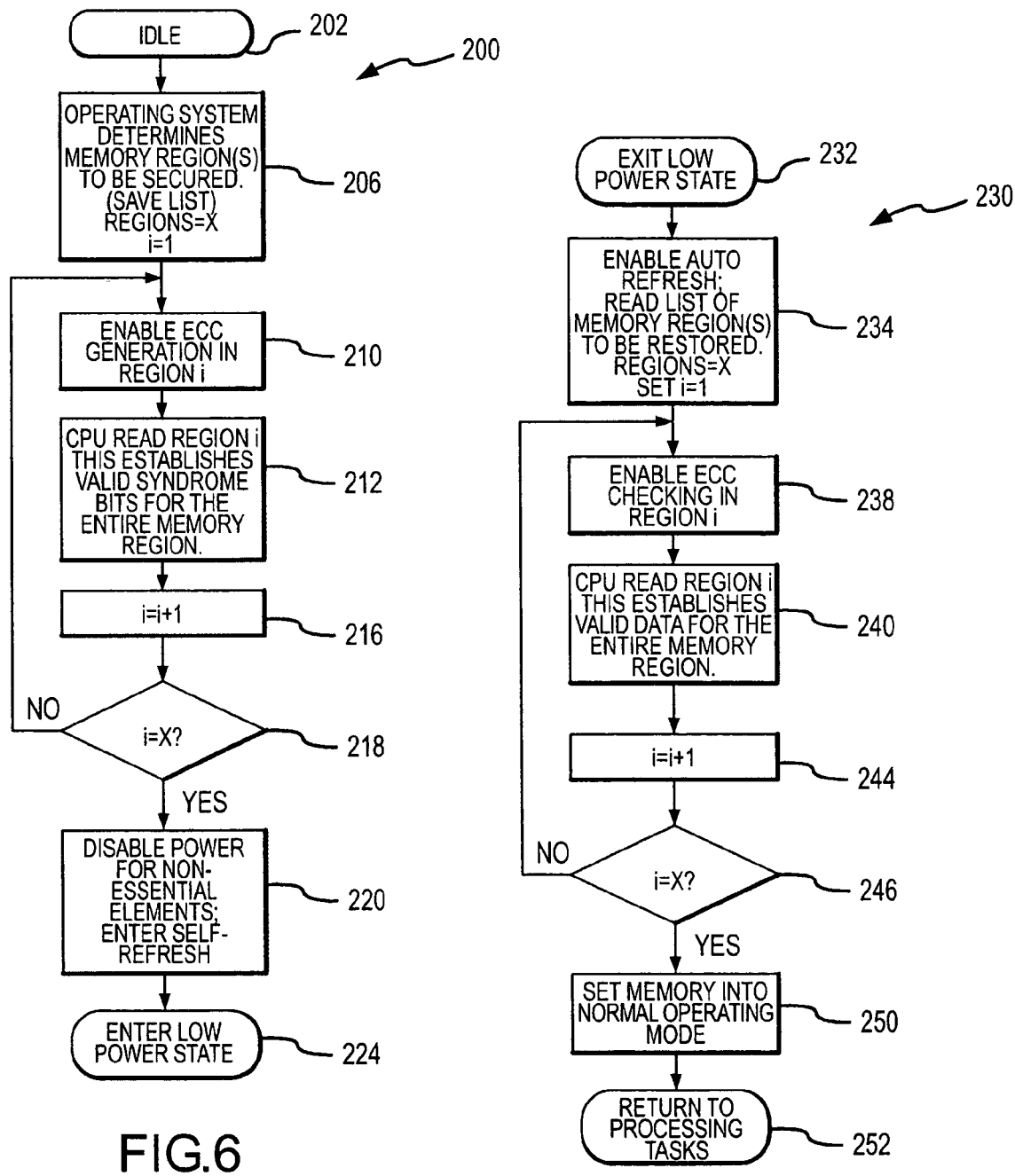
FIG. 6 is a flow chart showing the operation of the DRAM of FIG. 3 when entering a low power refresh mode using ECC techniques to correct data retention errors for essential data.
FIG. 7 is a flow chart showing the operation of the DRAM of FIG. 3 when exiting the low power refresh mode.

The operation of the SDRAM 100 when entering and exiting the ECC protected low power refresh mode will now be explained with reference to FIGS. 6 and 7. With reference to FIG. 6, a procedure 200 is initially in an idle state 202 prior to entering the low power refresh mode. Prior to entering the low power refresh mode, the operating system for the CPU 14 determines at step 206 the regions of the memory banks 122 that are to be ECC protected. More specifically, a variable "i" designating the first region of memory that will be protected in initialized to "1", and the last region of memory that will be protected is set to a variable "X." A record of this determination is also stored at step 206 in a suitable location, such as a register internal to the CPU 14 or memory controller 30. When the ECC protected low power refresh mode is to be entered, the CPU 14 first enables the ECC mode at step 210. This is accomplished by either writing a mode bit to the mode register 164 or writing appropriate bits to the control register 174, as explained above with reference to FIG. 4. The CPU 14 then reads a first region of memory (i=1) in one of the banks 122 at step 212, and, in doing so, generates and stores syndromes for the read data. The region to be protected ("i") is then incremented by 1 at step 216, and a check is made at step 218 to determine if the region currently being ECC protected is the final region that will be protected. If not, the process returns to repeat steps 210-218.

When all of the protected regions have been read, the procedure branches from step 218 to step 220 where the CPU 14 disables the ECC protection. This can be accomplished by the CPU 14 either writing a mode bit to the mode register 164 or resetting the bit 180 in the control register 174, as explained above with reference to FIG. 4. The CPU 14 then enters the low power refresh mode at step 224, which is preferably a self-refresh mode, the nature of which is well-known to one skilled in the art. This can be accomplished by the CPU writing an appropriate bit to the mode register 164. The control logic 156 then issues a control signal to the refresh timer 132 to reduce the refresh rate. The SDRAM 100 then operates in a reduced refresh rate, which substantially reduces the power consumed by the SDRAM 100.

I claim:

1. A method of reducing the power consumed by a memory device, comprising:
   refreshing memory cells in the memory device at a first rate when the memory device is active;
   refreshing at least some of the memory cells in the memory device at a second rate when the memory device is inactive, the second rate being substantially slower than the first rate;
   prior to transitioning from the first rate to the second rate, transitioning to an ECC protection mode by:
      determining which memory cells are storing data that should be protected from data retention errors;
      reading data from the memory cells determined to be storing data that should be protected;
      generating ECC syndromes corresponding to the read data; and
      storing the generated syndromes; and
   transitioning from the second rate to the first rate and thereafter continuing to refresh the memory cells that are storing data that should be protected at the second rate without using the ECC syndromes to determine if any of the data stored in the memory cells are in error until a request is received to read data from the memory cells that are storing data that should be protected;
   when a request is received to read data from at least some of the memory cells that are storing data that should be protected:
      reading the data that are the subject of the read request from the memory cells that are storing the read data;
      reading the stored ECC syndromes corresponding to the read data;
      using the syndromes to determine if any of the read data are in error;
      correcting any read data found to be in error to provide corrected data;
      storing the corrected data in the memory cells; and
      outputting the corrected data from the memory device.

2. The method of claim 1 wherein the act of determining which memory cells are storing data that should be protected from data retention errors comprises using a processor that is connected to the memory device to determine which memory cells are storing data that should be protected from data retention errors.

3. The method of claim 1 wherein the act of reading the data that are the subject of the read request from the memory cells that are storing the read data comprises using a processor that is connected to the memory device to read the data from the memory cells that are storing the read data.

4. The method of claim 1 wherein the act of reading the data that are the subject of the read request from the memory cells that are storing the read data comprises initiating and controlling a read operation from within the memory device.

5. The method of claim 1 wherein the act of generating ECC syndromes corresponding to the read data comprises generating the ECC syndromes within the memory device.

6. The method of claim 1 wherein the system further comprises a memory controller coupled to the memory device, and wherein the act of generating ECC syndromes corresponding to the read data comprises generating the ECC syndromes within the memory controller.

7. The method of claim 1 wherein the act of storing the generated syndromes comprises storing the generated syndromes within the memory device.

8. The method of claim 7 wherein the act of storing the generated syndromes within the memory device comprises storing the generated syndromes in memory cells.

9. The method of claim 1 wherein the act of reading the stored ECC syndromes corresponding to the read data comprises reading the stored ECC syndromes from the memory device.

10. The method of claim 1 wherein the act of using the syndromes to determine if any of the read data are in error comprises determining if any of the read data are in error within the memory device using the syndromes.

11. The method of claim 1 wherein the system further comprises a memory controller coupled to the memory device, and wherein the act of using the syndromes to determine if any of the read data are in error comprises determining if any of the read data are in error within the memory controller using the syndromes.

12. The method of claim 1 wherein the act of correcting any read data found to be in error comprises using the memory device to correct any read data found to be in error.

13. The method of claim 1 wherein the system further comprises a memory controller coupled to the memory device, and wherein the act of correcting any read data found to be in error comprises using the memory controller to correct any read data found to be in error.

14. The method of claim 1 wherein the act of storing the corrected data in the memory cells comprises using a processor connected to the memory device to store the corrected data in the memory cells.

15. The method of claim 1 wherein the act of storing the corrected data in the memory cells comprises writing the corrected data to the memory cells in a burst write operation.

16. The method of claim 1, further comprising providing a tag for each data word that should be protected, the tag indicating whether or not a valid syndrome exists for the corresponding data word.

17. The method of claim 16, further comprising setting the tag for each word to indicate a valid syndrome does not exist for the word when data is written to a part of one of the stored data words.

* * * * *